United States Patent [19]

Whitman et al.

[11] 4,429,344
[45] Jan. 31, 1984

[54] CONDUCTIVE FOILS FOR SOLID DIELECTRIC CAPACITOR

[75] Inventors: Boyce D. Whitman, Six Mile; Robert F. Bates, Liberty, both of S.C.

[73] Assignee: Sangamo Weston, Inc., Norcross, Ga.

[21] Appl. No.: 378,320

[22] Filed: May 14, 1982

[51] Int. Cl.³ .................... H01G 1/01; H01G 13/00; H01G 4/08
[52] U.S. Cl. .................................. 361/303; 29/25.42; 361/325
[58] Field of Search ............... 361/303, 305, 306, 312, 361/315, 325; 29/25.42

[56] References Cited

U.S. PATENT DOCUMENTS

| | | | |
|---|---|---|---|
| 1,479,315 | 1/1924 | Pickard | 361/325 X |
| 1,574,424 | 2/1926 | Hatch | 361/325 |
| 3,185,907 | 5/1965 | McKee et al. | 29/25.42 X |
| 3,221,228 | 11/1965 | Carter et al. | 29/25.42 X |
| 3,235,939 | 2/1966 | Rodriguez et al. | 29/25.42 |
| 3,275,916 | 9/1966 | Phillips et al. | 361/303 |
| 3,654,533 | 4/1972 | Porta et al. | 361/303 |
| 4,236,038 | 11/1980 | Taylor | 361/306 X |

Primary Examiner—Donald A. Griffin
Attorney, Agent, or Firm—Dale Gaudier

[57] ABSTRACT

Electrical contact between foil electrodes and conductive coated plates in a solid dielectric capacitor is improved by coating or embossing the foil electrodes with a conductive particulate material.

15 Claims, 3 Drawing Figures

CONDUCTIVE FOILS FOR SOLID DIELECTRIC CAPACITOR

BACKGROUND OF THE INVENTION

1. Field of the Invention

The invention relates to the field of capacitors, and more particularly, to an improved coating for use between a foil-type electrode and a plate of a solid dielectric capacitor.

2. Description of the Prior Art

Solid dielectric capacitors generally comprise one or more thin sheets of solid dielectric material, such as mica, having an electrically conductive material applied on one or both sides thereof by various well-known techniques, such as spraying or silk screening. Typically, the conductive material is a silver-based paint. The coated mica plates are stacked one atop another, with thin conductive foil electrodes interleaved therebetween to form the capacitor. The conductive coating on the dielectric sheets acts as one of the plates of the capacitor, while the foil electrodes are used to provide connection with external terminals. The entire package may be encapsulated or otherwise sealed in a well-known manner to form the finished capacitor. Representative examples of such capacitor construction are shown in U.S. Pat. Nos. 3,718,844, 3,229,173, 2,935,669, and 2,522,713.

One problem that arises in manufacturing solid dielectric capacitors having foil electrodes is that some means must be provided for securing the alternating layers of dielectric and foil electrodes together. The most prevalent and economical way of doing this is to interleave the foil electrodes and sheets of solid dielectric material and then impregnating the stacked sections with a bonding agent, such as by dipping the stacked sections into the bonding agent. The bonding agent can be, for example, wax, varnish, epoxy, or other types of adhesive.

Alternatively, the bonding agent can be first applied to the foil electrodes by various well-known means such as spraying, dipping, etc. The coated foil electrodes and dielectric sheets are then laminated together, typically by a combination of heating and pressure which acts to squeeze out excess bonding agent and to bond the various components together into a single unit.

One drawback to the use of such bonding agents is that they typically are insulators which, if improperly applied or cured, can remain in sufficient thickness and quantity on the foil electrode to prevent good electrical contact from occurring between the electrodes and the adjacent capacitor plates. Such a condition increases the electrode resistance and reduces the performance of the capacitor, especially at very low voltages.

SUMMARY OF THE INVENTION

The foregoing problem is overcome by the present invention wherein a conductive particulate material is applied between a foil electrode and a plate of a solid dielectric capacitor. Preferably, the conductive particulate material is coated or mixed with a bonding agent prior to the agent being coated on the foil electrodes or capacitor plates. Typically, the bonding agent is varnish, epoxy resin, and/or acrylic adhesive and the particulate material consists of flakes of a conductive material, for example silver, copper, gold, etc., suspended therein. The bonding agent/conductive material mixture is preferably applied to the foil electrodes by dipping or spraying. The coated electrodes are then interleaved between the solid dielectric sheets (such as mica) having conductive coatings (which act as the capacitor plates) previously applied thereto. The interleaved dielectric sheets and foil electrodes are then subjected to heating and pressure whereby the bonding agent is caused to secure the various components (foil electrodes, capacitor plates and dielectric sheets) together as a single unit.

An important feature of the invention is that during the heating and compression steps, the particulate material, which preferably has an irregular shape, is caused to intimately contact the surface of the foil electrode and the conductive coating which acts as one plate of the capacitor. In this manner, good electrical contact is assured between the foil electrodes and the material acting as the capacitor plates, without resort to expensive and exotic bonding agents.

Advantageously, the use of coated foil electrodes according to the invention enables the electrical conductivity between the foil electrodes and the conductive coating on the dielectric sheet to be precisely controlled and to be repeatable from capacitor to capacitor, despite slight variations in the thickness of the foil, dielectric or coatings, or in bonding temperatures or pressures.

In order to further assure good electrical contact between the foil electrodes and the particulate material coated thereon, the coated electrode may be subjected to pressure substantially normal to the coated foil surface to cause the particulate material to be embossed into the surface of the foil. The coated foil can then be laminated to the dielectric sheets as mentioned above.

BRIEF DESCRIPTION OF THE DRAWING FIGURES

These and other features and advantages of the present invention will be apparent from the following detailed description of the preferred embodiment when taken in conjunction with the accompanying drawing figures wherein.

DETAILED DESCRIPTION OF THE PREFERRED EMBODIMENT

Figure 1:
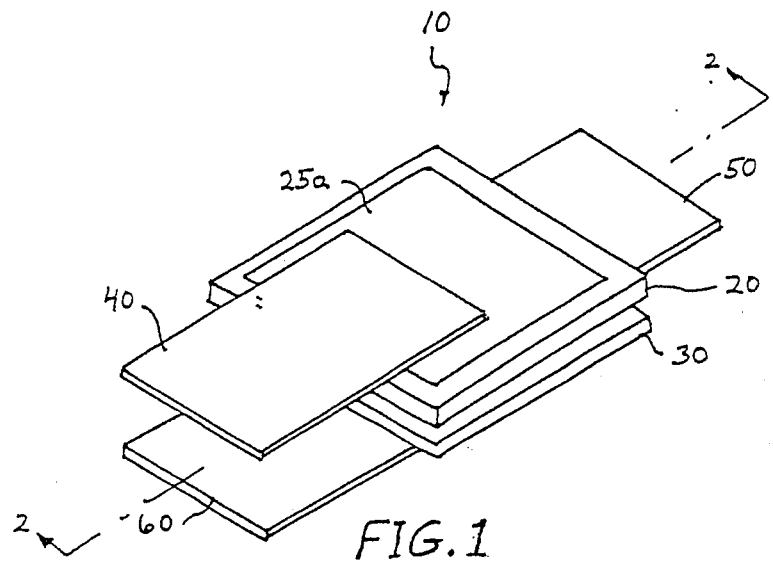
FIG. 1 is a perspective view of a capacitor constructed according to the invention.

FIG. 1 shows a typical construction for a capacitor constructed according to the present invention. Capacitor 10 comprises one or more planar sheets of solid dielectric material, with two such sheets 20 and 30 shown in FIG. 1. Dielectric sheets 20 and 30 are formed, for example, from a solid dielectric material such as mica.

Each sheet 20 and 30 has a conductive coating 25a, 25b, 35a, 35b, applied on at least one surface thereof. These conductive coatings can be, for example, a layer of silver paint applied in a known manner, such as by spraying or silkscreening.

Figure 2:
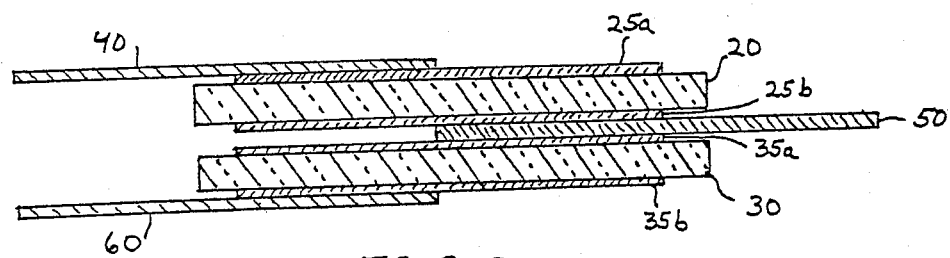
FIG. 2 is a cross-sectional view of the capacitor of FIG. 1 taken along line 2—2.

Interleaved between dielectric sheets 20 and 30, and bonded to the outer conductive coatings 25a and 35b, are conductive foil electrodes 40, 50 and 60 (shown more clearly in FIG. 2). The foil electrodes may be formed from tin-lead, copper, silver or aluminum, for example, using known techniques.

The dielectric sheets, conductive coatings and foil electrodes are bonded together in a manner to be described below to form the capacitor. As will be appreciated, conductive coatings 25a, 25b, 35a, 35b act as the plates of the capacitor 10 when charge is applied thereto via the foil electrodes. To complete the capacitor, wire-type electrodes may be applied to the foil electrodes and the capacitor potted or encapsulated in an insulating material in a known fashion.

In bonding together the foil electrodes to the conductive coatings on the dielectric sheets, it is the usual practice to use an adhesive bonding agent such as varnish, epoxy resin, or acrylic adhesive. The foil electrodes and dielectric sheets are stacked together and the stacked sections impregnated with the bonding agent, such as by dipping the stacked sections into the bonding agent. The bonding agent flows under pressure between the foil electrodes and dielectric sheets and, when cured, acts to secure the sections together. Alternatively, the bonding agent can be applied to the foil electrodes by spraying or dipping. The coated foil electrodes and conductive coated dielectric sheets are then interleaved with one another and pressure and heat applied to cause the bonding agent to be squeezed out between the interleaved layers of dielectric sheets and foil electrodes. Heating causes the bonding agent to dry out and set so that all the interleaved layers are secured together as a unitary package.

It will be appreciated that, as the aforementioned bonding agents are dielectric materials themselves, unless virtually all of the bonding agent is squeezed out between the foil electrodes and the facing portions of the conductive coatings on the dielectric sheets, or if too much bonding agent flows therebetween during impregnation, the electrical contact between the foil electrodes and the conductive coatings on the dielectric sheets will not be perfect. In fact, small uncontrollable changes in impregnation pressure or bonding pressure and temperature or in the thickness of the bonding agent applied to the foil electrodes can cause the electrical conductivity between the foil electrodes and the conductive coatings on the dielectric sheets to vary over a wide range.

Thus, unless extreme care is taken in applying a uniform thickness of the bonding agent on the foil electrodes, and in applying a precise and substantially equal bonding pressure normal to the entire contacting surfaces between the electrodes and the conductive coatings on the dielectric sheets, the electrical conductivity (and hence electrode resistance) between the electrodes and the conductive coating on the dielectric sheets will vary. This leads to unpredictable performance of the capacitor, especially at low voltages.

In order to overcome this problem, a conductive particulate material 70 (FIG. 3) is applied between the conductive foil electrodes and the conductive layer acting as the capacitor plates. Preferably, the conductive particulate material is mixed or coated with a bonding agent 80 and then coated on the foil electrodes or, alternatively, on the capacitor plates. When the foil electrodes and capacitor plates are compressed together the conductive particulate material contained in the bonding agent is caused to contact the foil electrodes and the facing portions of the capacitor plates to provide good electrical contact therebetween.

Figure 3:
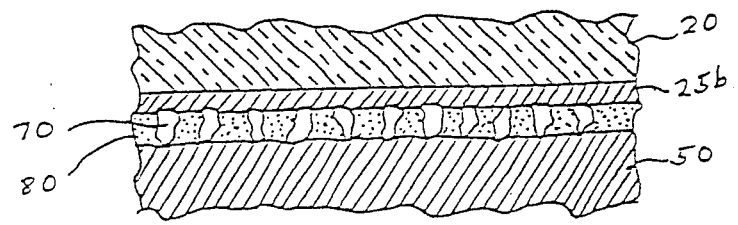
FIG. 3 is a magnified cross-section of a portion of the capacitor of FIG. 2.

As shown in FIG. 3, the conductive particulate material is preferably irregular in shape so as to insure that the conductive particulate material 70 completely penetrates the compressed layer of bonding agent 80 and thus slightly gouges the surfaces of capacitor plate 25b and foil electrode 50.

Conductive particulate material 70 can be formed from virtually any kind of conductive material including silver, gold, iron, copper, carbon, indium or electrically conductive alloys thereof. Particulate material 70 can be formed by milling or ball grinding to produce irregularly shaped particles or flakes as shown in FIG. 3. It has been found from experimentation that the size of the individual flakes of particulate material 70 can range in size from approximately 1 micron to 20 mesh (20 particles per inch or approximately 1300 microns). It has also been found experimentally that the best results are obtained when the average size of the particulate material is approximately 10 microns.

Preferably, the particulate material is suspended in or mixed with a bonding agent such as varnish, epoxy, or acrylic adhesive (or mixtures thereof). The weight ratio of conductive particulate material to bonding agent can range from approximately 1:99 to 99:1.

The bonding agent containing the conductive particulate material is coated on the foil electrodes by dipping, spraying, or other conventional coating techniques. Depending upon the type of bonding agent used, the coated foil electrodes may be dried at ambient temperature or may be heat dried to "set up" the bonding agent. The coated foils are then interleaved with the conductive coated dielectric sheets (such as 20 and 30 shown in FIGS. 1 and 2) and then subjected to a combination of heat and pressure whose values would depend upon the type of bonding agent used, the average size of the particulate material, and the thickness of the foil electrodes and dielectric sheets. This causes the various components comprising capacitor 10 to be permanently secured together. Subsequently, wire-type electrodes may be applied to the foil electrodes, and the capacitor potted or encapsulated in a known manner.

The electrical contact between particulate material 70 and a foil electrode may be further improved, prior to the aforementioned bonding step, by subjecting the coated foil electrode surfaces to a pressure normal to the plane of the surface (such as by pulling the coated foil electrodes between the nip of a pair of compression rollers) to cause the particulate material to be embossed into the surface of the foil electrode.

EXAMPLE 1600 coated foil capacitors were formed by mixing particles of silver having an average size of 10 microns in epoxy resin in a weight ratio of silver to epoxy resin of 8.6 to 1. The foil electrodes were dipped in the mixture and then bonded to silvered mica sheets. Wire electrodes were added to the foil electrodes and the entire package encapsulated.

A control group of 450 capacitors were formed as above, except that no conductive particulate material was added to the epoxy resin.

A test for intermittents was performed on all 1600 coated foil capacitors and the 450 non-coated foil capacitor control group by monitoring capacitance while alternately immersing units in hot and cold liquid baths. Any erratic capacitance change was termed a failure.

Of the 1600 coated foil capacitors, none failed. Of the 450 non-coated foil capacitors comprising the control group, 300 failed.

While the present invention has been described in considerable detail, it is understood that various changes and modifications would be apparent to those skilled in the art. For example, the number of dielectric sheets and foil layers are a matter of choice and would depend upon the amount of capacitance desired. It is not necessary to the practice of this invention that the conductive particulate material be suspended or mixed in a bonding agent. Thus, the particulate material may be applied as a powder to the surface of the foil electrodes or capacitor plates and the various components (electrodes, dielectric sheets, and conductive coatings) can be bonded together in some other fashion, such as by encapsulation, pressure molding, impregnation with a bonding agent, or through the use of adhesive only at the corners or outer edges of the various components.

The foregoing is not intended to be limitive but only illustrative of the invention which is defined by the appended claims.

What is claimed is:

1. In a method of forming a solid dielectric capacitor having at least one foil-type electrode and a conductive layer provided on said dielectric acting as a plate for said capacitor, the improvement comprising:
    applying a conductive particulate material between said electrode and said capacitor plate; and
    bonding said electrode to said capacitor plate.

2. The method of claim 1, wherein said conductive particulate material is coated with a bonding agent prior to said application step.

3. The method of claim 1 wherein said application step is performed by spraying or dipping said particulate material on said foil electrode.

4. The method of either claim 1 or 3 further including the step of embossing said particulate material into said foil electrode subsequent to said application step.

5. The method of claim 1 wherein said conductive particulate material is irregular in shape.

6. In a capacitor having at least one solid dielectric layer, a conductive layer formed on either side of said dielectric acting as plates for said capacitor, and foil-type electrodes associated with each of said capacitor plates, the improvement comprising:
    a conductive particulate material applied between each said foil electrode and each said capacitor plate, whereby electrical contact is improved therebetween.

7. The capacitor of claim 6 wherein said particulate material is embossed into each said foil electrode.

8. The capacitor of either claim 6 or 7 wherein said conductive particulate material is irregular in shape.

9. The capacitor of either claim 6 or 7 wherein said particulate material is coated with an adhesive bonding agent to aid in bonding said foil electrode to said plate.

10. The capacitor of claim 9 wherein said bonding agent is chosen from the group of varnish, epoxy, or acrylic adhesive, or mixtures thereof.

11. The capacitor of claim 9 wherein the weight ratio of conductive particulate material to bonding agent ranges from approximately 1:99 to 99:1.

12. The capacitor of claim 9 wherein the conductive particulate material is silver, the bonding agent is epoxy resin, and the weight ratio of conductive particulate material to bonding agent is approximately 8.6 to 1.

13. The capacitor of claim 6 wherein said conductive particulate material is chosen from the group consisting of silver, copper, gold, iron, carbon, indium or electrically conductive alloys thereof.

14. The capacitor of claim 6, wherein said particulate material ranges in size from approximately 1 micron to 1300 microns.

15. The capacitor of claim 6, wherein the average size of said particulate material is approximately 10 microns.

* * * * *